United States Patent
Li et al.

(10) Patent No.: US 7,916,968 B2
(45) Date of Patent: Mar. 29, 2011

(54) ADJUSTING APPARATUS FOR ENHANCING THE CONTRAST OF IMAGE AND METHOD THEREFOR

(75) Inventors: Jyun-Sian Li, Tainan (TW); Shin-Tai Lo, Miaoli County (TW); Ruey-Sing Weng, Kaohsiung (TW); Ching-Fu Hsu, Taichung County (TW)

(73) Assignee: Wintek Corporation, Taichung (TW)

( * ) Notice: Subject to any disclaimer, the term of this patent is extended or adjusted under 35 U.S.C. 154(b) by 797 days.

(21) Appl. No.: 11/943,891

(22) Filed: Nov. 21, 2007

(65) Prior Publication Data
US 2008/0118176 A1   May 22, 2008

Related U.S. Application Data

(60) Provisional application No. 60/866,608, filed on Nov. 21, 2006.

(51) Int. Cl.
*G06K 9/36* (2006.01)
(52) U.S. Cl. ........ 382/274; 382/260; 382/275; 382/282; 358/3.26; 358/3.27; 358/463
(58) Field of Classification Search .................. 382/260, 382/274, 275, 282; 358/3.26, 3.27, 463
See application file for complete search history.

(56) References Cited

U.S. PATENT DOCUMENTS

| | | | | |
|---|---|---|---|---|
| 6,571,000 | B1 * | 5/2003 | Rasmussen et al. | 382/112 |
| 6,625,333 | B1 * | 9/2003 | Wang et al. | 382/300 |
| 6,728,401 | B1 * | 4/2004 | Hardeberg | 382/167 |
| 6,829,374 | B2 * | 12/2004 | Schwartz et al. | 382/117 |

OTHER PUBLICATIONS

Yeong-Taeg Kim, "Contrast Enhancement Using Brightness Preserving Bi-Histogram Equalization" Consumer Electronics by Institute of Electrical and Electronic Engineers (IEEE), 1997, pp. 1-8.
Tien-Chu Hsu et al., "Fuzzy Contrast Correction (FCC) for Image Contrast Enhancement" Society for Information Display (SID), 2006, 3 pages.

* cited by examiner

*Primary Examiner* — Yosef Kassa
(74) *Attorney, Agent, or Firm* — J.C. Patents

(57) ABSTRACT

An adjusting apparatus for enhancing the contrast of an image and a method therefor are provided. The adjusting apparatus includes a mask processor, a brightness detecting unit, a brightness adjusting unit, a ratio calculating unit and a contrast enhancing unit. The mask processor retrieves a pixel matrix from an original image according to its mask dimension, and outputs a specific pixel corresponding to a specific position in the pixel matrix. Then, the brightness detecting unit, the brightness adjusting unit and the ratio calculating unit are coupled in series to process the image according to relations of each sub-pixel of the pixel matrix, so as to obtain an adjusting ratio. Thereby, the contrast enhancing unit multiplies the value of the adjusted specific pixel by the adjusting ratio to enhance the contrast of the image.

24 Claims, 9 Drawing Sheets

FIG. 12A  FIG. 12B
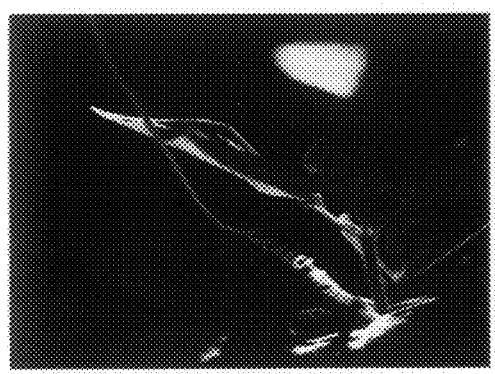
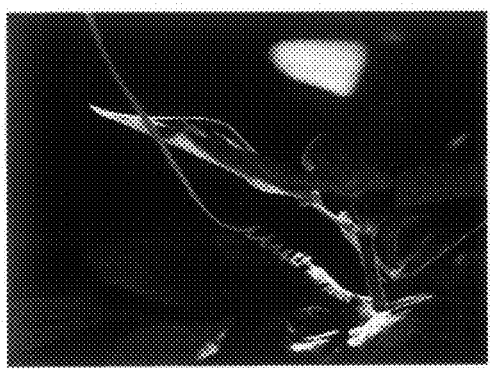
FIG. 13A  FIG. 13B
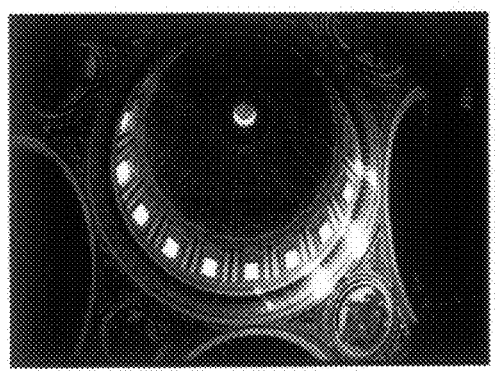
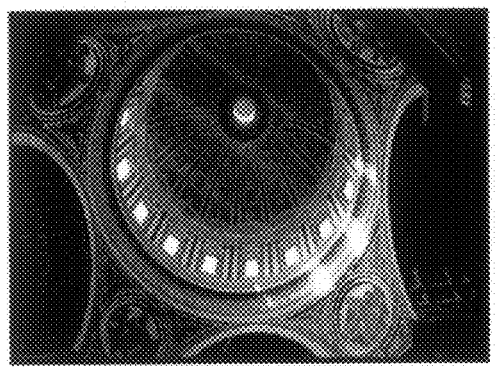
FIG. 14A  FIG. 14B

FIG. 15A　　　　FIG. 15B
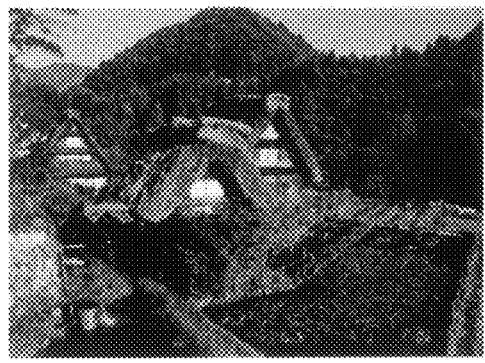
FIG. 16A　　　　FIG. 16B

ADJUSTING APPARATUS FOR ENHANCING THE CONTRAST OF IMAGE AND METHOD THEREFOR

CROSS-REFERENCE TO RELATED APPLICATION

This application claims the priority benefit of U.S.A. provisional application Ser. No. 60/866,608, filed on Nov. 21, 2006. The entirety of the above-mentioned patent application is hereby incorporated by reference herein and made a part of this specification.

BACKGROUND OF THE INVENTION

1. Field of the Invention

The present invention relates to a method for enhancing the contrast of an image and an apparatus therefor. More particularly, the present invention relates to a method for enhancing the contrast of an image and an apparatus therefor by using a mask processor to reduce a memory space.

2. Description of Related Art

Due to rapid advances of a variety of multimedia applications, multimedia technologies have been widely adopted in mobile devices. For instance, cell phones, personal digital assistants (PDAs), digital cameras, global positioning systems (GPSs), or the like mobile devices are equipped with an audio-visual playback function. As the multimedia technologies are integrated into the mobile devices, various image processing technologies must be taken into consideration, such as image compression, image sharpness, contrast enhancement of the images, and so on. Thereby, users of the mobile devices are able to watch the images of high definition.

Here, the contrast enhancement of the image is conducive to an improvement of image qualities, for not only each and every detail in the image is displayed distinctly, but also a depth-of-focus of the image is significantly improved and the stereoscopic image can be achieved. In light of the foregoing, the attention from the public has been drawn to the way to integrate an apparatus for enhancing the contrast into a miniaturized mobile device. Several references pertinent to the related art with respect to the contrast enhancement of the image are briefly described hereinafter.

The first reference is a thesis entitled "Contrast Enhancement Using Brightness Preserving Bi-histogram Equalization" published in Transactions on Consumer Electronics by Institute of Electrical and Electronic Engineers (IEEE) in the year of 1997.

In the prior art reference, the histogram equalization is used for contrast enhancement of an image. Referring to the histograms of FIGS. 1 and 2, the histogram equalization refers to an analysis of gray-scale distribution of the entire image, so as to establish the histogram as shown in FIG. 1. Afterwards, the histogram constituted by the image is analyzed and calculated, so as to approximate the number of the pixels of bright parts of the image to the number of the pixels of dark parts of the image. Further, the contrast among the pixels is enhanced. In other words, as shown in FIG. 2, the luminance distribution of the image indicated in the histogram is more equalized. Note that the conventional histogram equalization easily leads to distortion of image luminance, and thus the pixels of the image are divided into two regions having pixel values larger than or less than an average gray-scale value before the histogram equalization is conducted according to the prior art reference, so as to perform another algorithm with respect to the histogram equalization on the bright region and on the dark region, respectively. Thereby, distortion of image luminance may be further reduced.

Nevertheless, although the issue concerning distortion of image luminance is resolved by the prior art reference, massive memory spaces are required by the mobile devices according to this reference, such that the histogram constituting the entire image can be obtained. Moreover, two calculations performed on histogram equalization result in complexity of manufacturing the mobile devices.

The second reference is a thesis entitled "Fuzzy Contrast Correction for Image Contrast Enhancement" published by Society for Information Display (SID) in the year of 2006, which will be explained below as shown in FIGS. 3 and 4. FIG. 3 is a histogram illustrating a result of analyzing gray-scale distribution of an image, while FIG. 4 is a schematic diagram illustrating a function of enhancing the contrast of the image. Referring to FIGS. 3 and 4 together, in the prior art reference, the histogram is divided into a bright side and a dark side according to an average gray-scale value. After that, two peaks having a maximum pixel number, i.e., a, b, c, and d as indicated in FIG. 3, are retrieved from the bright side and the dark side, respectively. Thereby, with use of the peaks a~d, corresponding functions required by both the bright side and the dark side are chosen from the functions shown in FIG. 4, to enhance image contrast.

However, in this prior art reference, the massive memory space is still needed by the mobile devices for obtaining the histogram constituting the entire image. Besides, the required equipment for practicing the prior art reference is still of great complexity and is not apt to be applied to the mobile devices.

Based on the above, the prior art references are relatively complicated in terms of actual applications. Further, considerable memory capacity is required thereby, and thus said technologies disclosed by the prior art references are not adapted to the mobile devices due to the requirements for low costs and compactness.

SUMMARY OF THE INVENTION

The present invention is directed to an adjusting apparatus for enhancing the contrast of an image. With use of a mask processor, a portion of the image is processed at a time, so as to reduce a memory space of the adjusting apparatus and to further comply with requirements for low costs and compactness.

The present invention is further directed to an adjusting method for enhancing the contrast of an image. An adjusting apparatus employing the adjusting method is able to satisfy demands for low costs and compactness of medium and small mobile devices.

The present invention provides an adjusting apparatus for enhancing the contrast of an image and improving the quality of the image. The adjusting apparatus includes a mask processor, a brightness detecting unit, a brightness adjusting unit, a ratio calculating unit and a contrast enhancing unit.

The mask processor retrieves a pixel matrix from the image according to a mask dimension (e.g. m*n) of the mask processor. That is to say, m*n pixels of the image are framed as the pixel matrix. Besides, the mask processor searches and outputs a specific pixel corresponding to a specific position in the pixel matrix. The brightness detecting unit compares the pixel values of the sub-pixels in the pixel matrix, so as to output the greatest pixel value served as a brightness base value by the comparison result.

The outputted greatest pixel value then serves as a brightness base value. Afterwards, the brightness adjusting unit generates a brightness enhancement value by increasing the brightness base value and compares the brightness enhancement value with a maximum gray-scale value, so as to output the brightness enhancement value or the maximum gray-scale value based on the result of the comparison.

On the other hand, the ratio calculating unit adjusts the output of the brightness adjusting unit with use of a first threshold value as a base value and performs a division operation on the maximum gray-scale value and the adjusted output of the brightness adjusting unit, so as to obtain an adjusting ratio. Finally, the contrast enhancing unit adjusts the pixel values of the sub-pixels in the specific pixel with use of a second threshold value as the base value and multiplies the value of the adjusted specific pixel by the adjusting ratio, so as to output the value of the specific pixel processed by the method for enhancing the contrast.

Note that the adjusting apparatus processes each of the pixels of the image as the specific pixel as long as the mask processor scans the entire image. Thereby, the contrast of the entire image is enhanced.

From another perspective, the present invention provides an adjusting method for enhancing the contrast of an image and improving the quality of the image. The adjusting method includes firstly retrieving a pixel matrix from the image according to a mask dimension and outputting a specific pixel corresponding to a specific position in the pixel matrix. Next, the pixel values of the sub-pixel in the pixel matrix are compared, so as to obtain the greatest pixel value served as a brightness base value by the comparison result.

After the retrieval of the brightness base value, the adjusting method further includes generating a brightness enhancement value by increasing the brightness base value. Thereafter, the brightness enhancement value is compared with a maximum gray-scale value, so as to output the maximum gray-scale value or the brightness enhancement value based on a result of the comparison.

On the other hand, in order to properly adjust the brightness of each of the pixels, the brightness enhancement value or the maximum gray-scale value is adjusted with use of a first threshold value as a base value according to the adjusting method and a division operation is performed on the maximum gray-scale value and the adjusted value, so as to obtain an adjusting ratio.

After that, the pixel values of the sub-pixels in the specific pixel are adjusted with use of a second threshold value as the base value and the value of the adjusted specific pixel is multiplied by the adjusting ratio. Finally, in the adjusting method, the mask is moved by one pixel and the above steps are repeated until each of the pixels of the image is sequentially deemed the specific pixel. Thereby, each of the pixels of the image is processed as the specific pixel in sequence, so as to enhance the contrast of the entire image.

The mask processor is adopted to process the image in the present invention, and thus the memory space required by the adjusting apparatus of the present invention can be more effectively reduced in comparison with the related art. In other words, the contrast of the image can be enhanced in a more effective manner according to the present invention. Moreover, systems with use of the adjusting apparatus can be characterized by the low costs and compactness based on the present invention.

In order to make the aforementioned and other objects, features and advantages of the present invention more comprehensible, several embodiments accompanied with figures are described in detail below.

BRIEF DESCRIPTION OF THE DRAWINGS

FIGS. 12A through 16A are original images for simulation.

FIGS. 12B through 16B are images shown in FIGS. 12A through 16A as the original images but processed by an adjusting apparatus 600.

DESCRIPTION OF EMBODIMENTS

Figure 1:
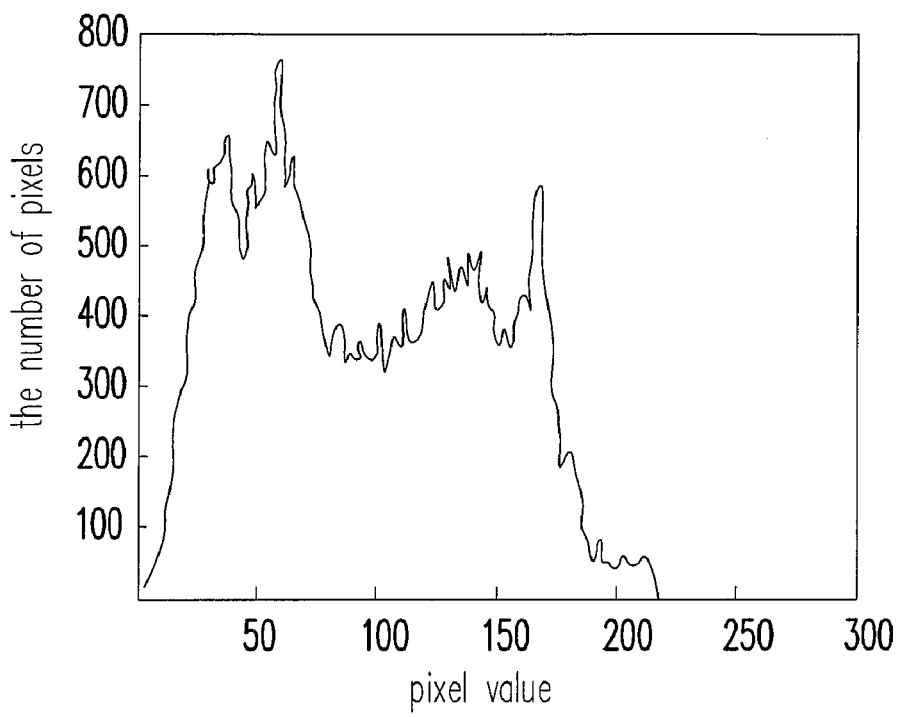
FIG. 1 is a schematic histogram for describing a first prior art reference.
Figure 2:
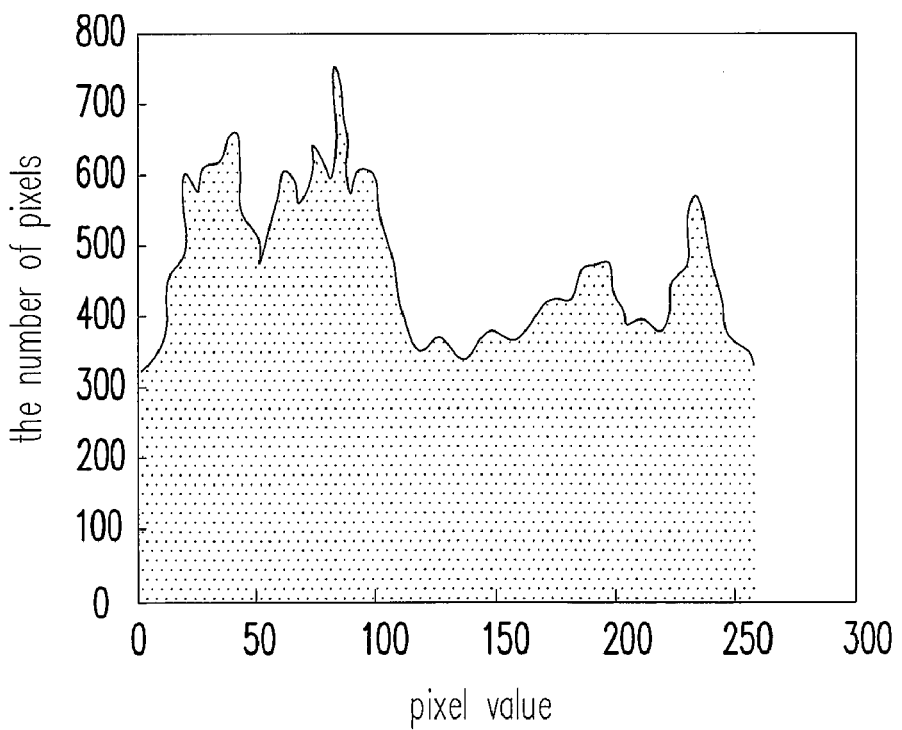
FIG. 2 is another schematic histogram for describing the first prior art reference.
Figure 3:
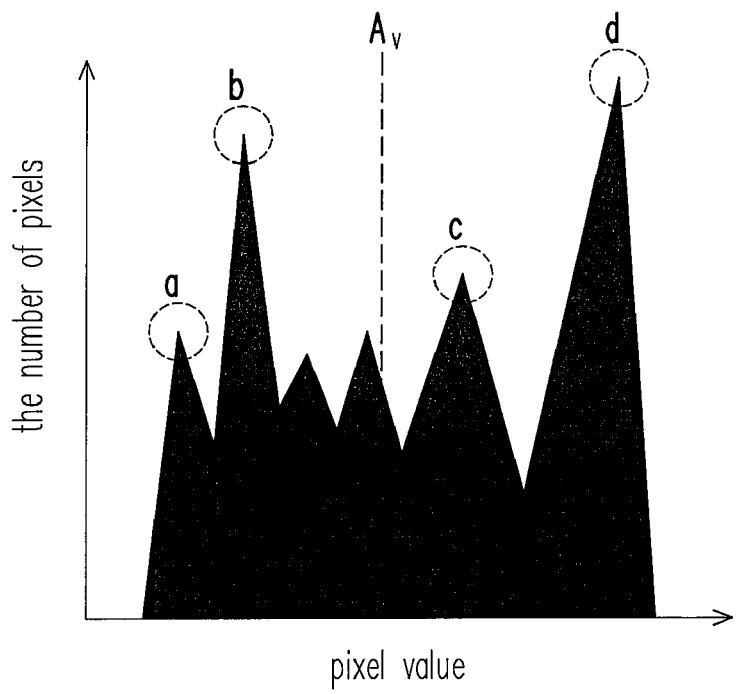
FIG. 3 is a schematic histogram for describing a second prior art reference.
Figure 4:
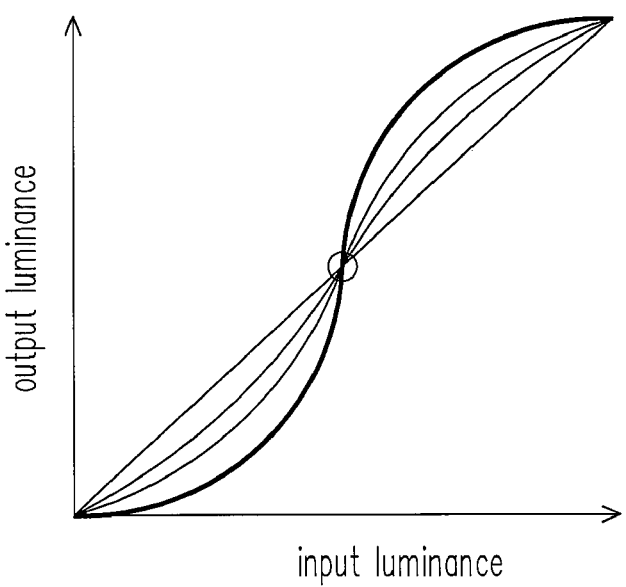
FIG. 4 is a schematic diagram for describing a function according to the second prior art reference.
Figure 5:
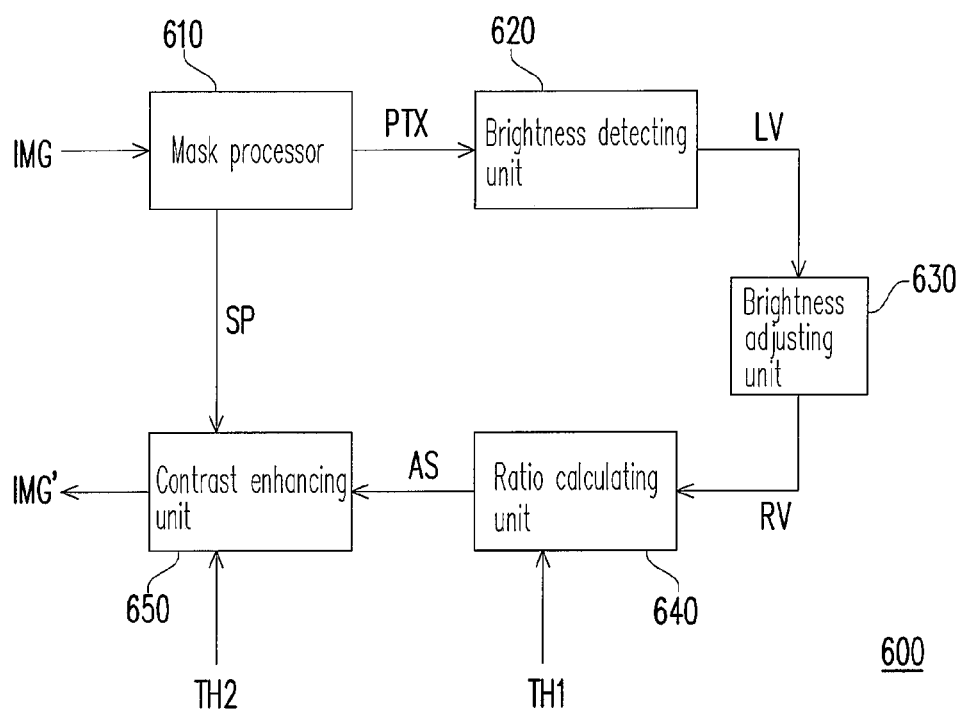
FIG. 5 illustrates an adjusting apparatus for enhancing the contrast of an image according to an embodiment of the present invention.

FIG. 5 illustrates an adjusting apparatus for enhancing the contrast of an image according to an embodiment of the present invention. Referring to FIG. 5, an adjusting apparatus 600 includes a mask processor 610, a brightness detecting unit 620, a brightness adjusting unit 630, a ratio calculating unit 640, and a contrast enhancing unit 650. The mask processor 610 is coupled to the brightness detecting unit 620 and the contrast enhancing unit 650. The brightness detecting unit 620 is coupled to the brightness adjusting unit 630. The brightness adjusting unit 630 is coupled to the ratio calculating unit 640, while the ratio calculating unit 640 is coupled to the contrast enhancing unit 650.

During the process of enhancing the contrast of an original image IMG, first of all, the mask processor 610 retrieves a pixel matrix PTX from the original image IMG according to a mask dimension of the mask processor 610. Besides, the mask processor 610 outputs a specific pixel SP corresponding to a specific position in the pixel matrix PTX. The specific position is corresponding to a center pixel of the pixel matrix PTX. However, people skilled in the art may also change the relation between the specific position and the pixel matrix PTX based on actual design requirements.

Figure 6:
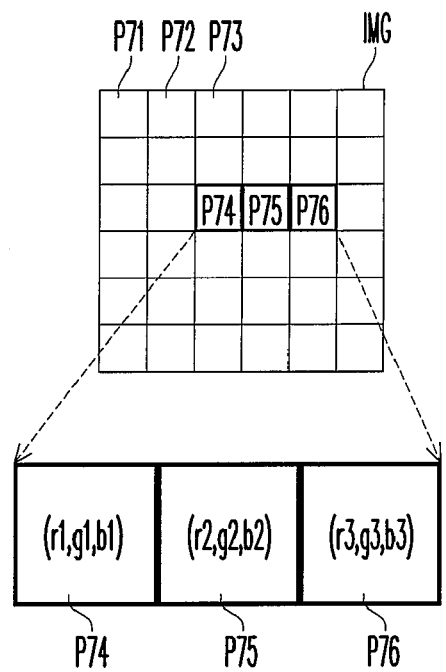
FIG. 6 is an image schematically illustrating the embodiment depicted in FIG. 5.

The image schematically depicted in FIG. 6 is taken for example. Referring to FIGS. 5 and 6 together, the original image IMG includes a plurality of pixels, such as pixels labeled as P71~P76, and each pixel includes three sub-pixels. For example, the pixel P74 includes the sub-pixels (r1,g1,b1), the pixel P75 includes the sub-pixels. (r2,g2,b2), and the pixel P76 includes the sub-pixels (r3,g3,b3). When the mask dimension of the mask processor 610 is 1*3, the mask processor 610 outputs one pixel matrix PTX after the original image IMG inputs the three pixels. For example, the pixel matrix PTX outputted by the mask processor 610 at a certain time is equal to [r1,g1,b1,r2,g2,b2,r3,g3,b3], and the pixel matrix PTX includes the pixels P74~P76. Here, the mask processor 610 outputs the pixel P75 as the specific pixel SP according to the specific position in the pixel matrix PTX. The following explanation of each sub-block of the adjusting apparatus 600 will be provided and exemplified by the image schematically depicted in FIG. 6.

The adjusting apparatus 600 receives each of the pixels in the original image IMG through the mask processor 610. Hence, the quantity of data to be processed by the adjusting apparatus 600 is determined upon the mask dimension of the mask processor 610. That is to say, in comparison with the related art, the adjusting apparatus 600 is able to enhance the contrast of the original image IMG without requiring massive memory spaces for pre-storing the entire original image IMG.

Referring to FIG. 5 again, after the brightness detecting unit 620 receives the pixel matrix PTX, the brightness detecting unit 620 compares the pixel values of the sub-pixels in the pixel matrix PTX. Then the brightness detecting unit 620 outputs a greatest pixel value served as a brightness base value LV by the comparison result, i.e., LV=max[r1,g1,b1,r2,g2,b2,r3,g3,b3]. For example, referring to FIG. 6, when the pixel matrix PTX=[100,125,85,70,72,77,100,101,110], the brightness detecting unit 620 compares the pixel values of the sub-pixels r1~r3, g1~g3, and b1~b3. At this time, if the pixel value (125) of the sub-pixel g1 is of the greatest value, the brightness detecting unit 620 outputs the brightness base value LV equal to 125.

Thereby, the brightness adjusting unit 630 processes an algorithm as indicated in the following equations (1)~(3) with use of the brightness base value LV.

$$LB=LV+PM \qquad (1)$$

$$\text{if } LB>(2^k-1), RV=(2^k-1) \qquad (2)$$

$$\text{else } RV=LB \qquad (3).$$

Here, LB stands for a brightness enhancement value.
PM stands for a constant.
RV stands for a value outputted by the brightness adjusting unit 630.

In addition, the sub-pixels of the pixels P71~P76 have a k-bit gray-scale resolution, and the maximum gray-scale value is $(2^k-1)$ where k is an integer larger than 0.

Based on the above algorithm, the degree to which the pixels are required to be increased is determined. As indicated in the equation (1), the brightness base value LV is first increased by the brightness adjusting unit 630, and the brightness enhancement value LB is obtained by adding the constant PM to the brightness base value LV. After that, as shown in the equations (2)~(3), the brightness adjusting unit 630 compares the brightness enhancement value LB with the maximum gray-scale value $(2^k-1)$, so as to determine if the value RV stands for the brightness enhancement value LB or the maximum gray-scale value $(2^k-1)$.

For example, suppose that the original image IMG has a 8-bit (k=8) gray-scale resolution, i.e., the maximum gray-scale value of the original image IMG is $2^8-1=255$, and that the brightness base value LV is equal to 125 and the constant PM is equal to 80, the algorithm is indicated hereinafter.

$$LB=125+80=205 \qquad (4)$$

$$\text{if } LB>255, RV=255 \qquad (5)$$

$$\text{else } RV=205 \qquad (6).$$

As shown in the equation (4), the brightness adjusting unit 630 firstly adds the brightness base value LV(125) to the constant(80), so as to obtain the brightness enhancement value LB(205). Thereafter, as indicated in the equations (5)~(6), since the brightness enhancement value LB(205) is less than the maximum gray-scale value(255), the value RV outputted by the brightness adjusting unit 630 is identical to the brightness enhancement value LB(205).

Referring to FIG. 5 again, after the degree to which the pixels are required to be increased is determined by the brightness adjusting unit 630, the algorithm as indicated in the following equation (7) is processed by the ratio calculating unit 640.

$$AS=(2^k-1)/(RV-TH1) \qquad (7).$$

Here, AS stands for an adjusting ratio, while TH1 represents a first threshold value.

The ratio calculating unit 640 adjusts the value RV outputted by the brightness adjusting unit 630 with use of the first threshold value TH1 as a base value. For example, the first threshold value TH1 is subtracted from the value RV outputted by the brightness adjusting unit 630. Thereafter, a division operation is performed on the maximum gray-scale value $(2^k-1)$ and the adjusted output (RV-TH1) of the brightness adjusting unit 630, so as to obtain the adjusting ratio AS.

Figure 7:
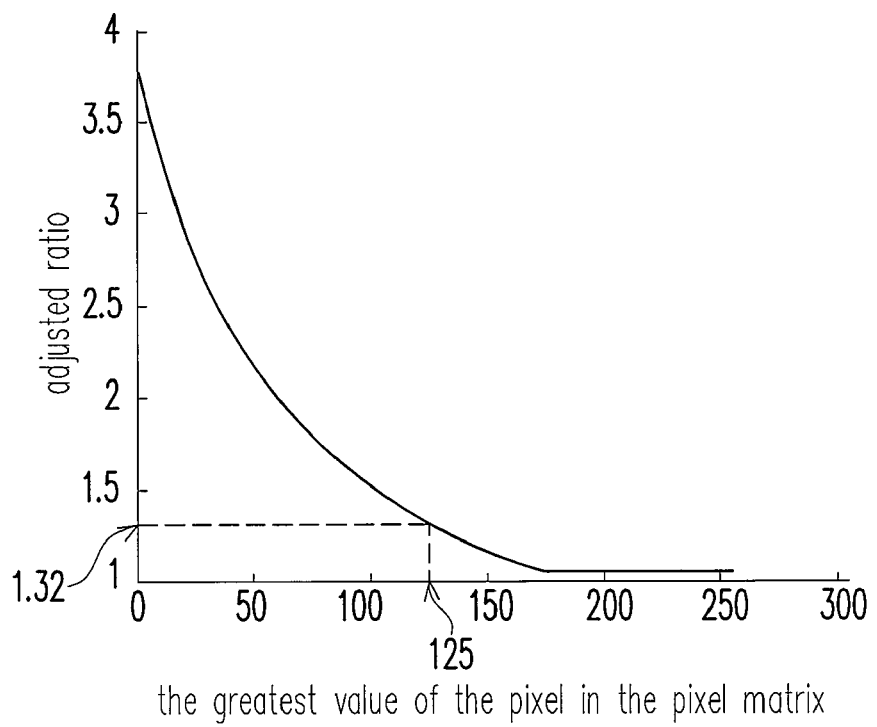
FIG. 7 is a curve diagram illustrating a relation between an adjusting ratio AS and a greatest pixel value in a pixel matrix according to the embodiment depicted in FIG. 5.

For example, as shown in FIG. 7, it is assumed that the value RV outputted by the brightness adjusting unit 630 is equal to 205, and that the brightness base value LV outputted by the brightness detecting unit 620 is equal to 125. Here, when the greatest pixel value of the pixel in the pixel matrix PTX is 125, the maximum gray-scale value is further assumed as 255(k=8) and the first threshold value TH1 is assumed as 12, which is indicated in the following equation (8).

$$AS=255/(205-12)=255/193=1.32 \qquad (8).$$

The ratio calculating unit 640 adjusts the brightness enhancement value RV(205) outputted by the brightness adjusting unit 630 with use of the first threshold value TH1. Namely, the first threshold value TH1(12) is subtracted from the value RV(205) outputted by the brightness adjusting unit 630, so as to obtain a value 193. Next, the ratio calculating unit 640 performs the division operation on the maximum gray-scale value(255) and the value 193, so as to further obtain the adjusting ratio AS equal to 1.32.

After the adjusting ratio AS is acquired, the adjusting apparatus 600 is able to properly adjust the brightness of each of the pixels through the contrast enhancing unit 650. The contrast enhancing unit 650 adjusts a pixel value of each of the sub-pixels in the specific pixel SP with use of a second threshold value TH2 as the base value and multiplies the value of the adjusted specific pixel SP by the adjusting ratio AS, so as to output the value of the specific pixel SP processed by the method for enhancing the contrast. Note that the adjusting apparatus 600 processes each of the pixels of the image as the specific pixel SP as long as the mask processor 610 scans the entire image. Thereby, the contrast of the entire image is enhanced. Finally, through the contrast enhancing unit 650, the adjusting apparatus 600 generates the image IMG' having an enhanced contrast.

The following equations (9)~(12) exemplify the above description.

$$r2'=(r2-TH2)=(70-12)=58 \qquad (9)$$

$$g2'=(g2-TH2)=(72-12)=60 \qquad (10)$$

$$b2'=(b2-TH2)=(77-12)=65 \qquad (11)$$

$$P75'=(r2',g2',b2')*AS=(58,60,65)*1.32=(76.56,79.2,85.8) \qquad (12)$$

When the second threshold value TH2 is equal to 12, and the specific pixel SP outputted by the mask processor 610 stands for the pixel P75 which is equal to (r2,g2,b2)=(70, 72, 77) as illustrated in FIG. 6, the contrast enhancing unit 650 adjusts the pixel values of the sub-pixels r2, g2, and b2 with use of the second threshold value TH2. That is to say, the second threshold value TH2(12) is subtracted from the pixel values of the sub-pixels r2, g2, and b2, so as to obtain the adjusted specific pixel SP'=(r2',g2',b2')=(58, 60, 65). Thereafter, the contrast enhancing unit 650 multiplies the value of the adjusted specific pixel SP' by the adjusting ratio AS (1.32), such that the pixel value P75'=(76.56, 79.2, 85.8) processed by the method for enhancing the contrast is outputted.

As depicted in FIG. 7, a curve diagram illustrating a relation between the adjusting ratio AS and the greatest pixel value in the pixel matrix PTX is given. Here, the less the greatest pixel value at an area around a certain pixel is, the darker the area is. On the contrary, the greater the greatest pixel value at the area around the certain pixel is, the brighter the area is. Accordingly, the adjusting ratio AS having a relatively small value is obtained.

Figure 8:
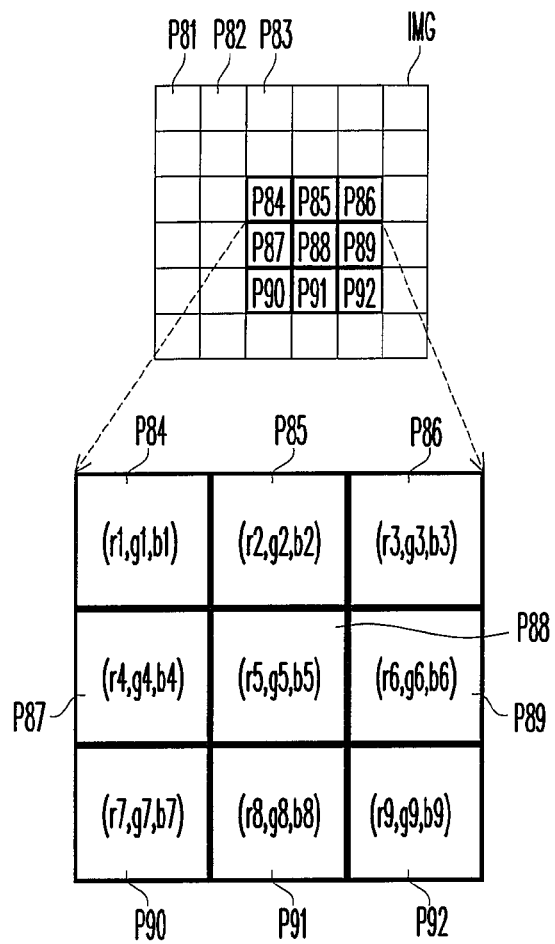
FIG. 8 is another image schematically illustrating the embodiment depicted in FIG. 5.

In order to enable people skilled in the art to infer all the technical features of the present invention according to the teachings of the present embodiment, the operating process taught by the embodiment depicted in FIG. 5 will again be elaborated by the image schematically illustrated in FIG. 8.

Please refer to FIGS. 5 and 8 together. In FIG. 8, the original image IMG includes a plurality of the pixels, such as the pixels marked as P81~P92, and each pixel includes three sub-pixels. For example, the pixel P84 includes the sub-pixels (r1, g1, b1), the pixel P85 includes the sub-pixels (r2, g2, b2), the pixel P86 includes the sub-pixels (r3, g3, b3) . . . and the pixel P92 includes the sub-pixels (r9, g9, b9). Besides, the original image IMG depicted in FIG. 8 is assumed to have the 8-bit gray-scale resolution. Namely, the following explanation of each sub-block illustrated in FIG. 5 will be provided when the maximum gray-scale value is equal to 255.

Here, the mask dimension of the mask processor 610 is assumed as 3*3. Therefore, the mask processor 610 outputs the pixel matrix PTX after the original image IMG inputs the nine pixels within the mask. For example, the pixel matrix PTX outputted by the mask processor 610 at a certain time is equal to [r1,g1,b1, . . . , r9,g9,b9], and the pixel matrix PTX includes the pixels P84~P92. Relatively speaking, after the mask processor 610 outputs the pixel P88 as the specific pixel SP according to the center pixel of the pixel matrix PTX, the brightness detecting unit 620 retrieves the greatest pixel value among the 27 sub-pixels in the pixel matrix PTX as the brightness base value LV. Said brightness base value LV=max (PTX)=max(r1,g1,b1,r2,g2,b2, . . . , r9,g9,b9).

Thereby, the brightness adjusting unit 630 processes an algorithm as indicated in the following equations (13)~(15) with use of the brightness base value LV obtained by the brightness adjusting unit 630.

$$LB=LV+PM \tag{13}$$

$$\text{if } LB>255, RV=255 \tag{14}$$

$$\text{else } RV=LB \tag{15}$$

Here, LB stands for the brightness enhancement value.
PM stands for the constant.
RV stands for the value outputted by the brightness adjusting unit 630.

Based on the algorithm indicated in the aforesaid equation (13), the brightness enhancement value LB is obtained by adding the constant PM to the brightness base value LV. Moreover, as shown in the equations (14)~(15), the brightness adjusting unit 630 determines if the value RV stands for the brightness enhancement value LB or the maximum gray-scale value(255).

After that, the algorithm indicated in the equation (16) is processed by the ratio calculating unit 640, such that the adjusting ratio AS is generated.

$$AS=(255)/(RV-TH1) \tag{16}$$

Here, through the ratio calculating unit 640, the first threshold value TH1 is subtracted from the value RV outputted by the brightness adjusting unit 630. Next, the ratio calculating unit 640 performs the division operation on the maximum gray-scale value(255) and the adjusted value (RV−TH1).

Thereby, as the specific pixel SP obtained by mask processor 610 is equal to (r5,g5,b5), the contrast enhancing unit 650 is able to process the algorithm indicated in the following equations (17)~(20).

$$r5'=(r5-TH2) \tag{17}$$

$$g5'=(g5-TH2) \tag{18}$$

$$b5'=(b5-TH2) \tag{19}$$

$$P88'=(r5',g5',b5')*AS \tag{20}$$

The adjusted specific pixel SP' equal to (r5',g5',b5') is then obtained. The contrast enhancing unit 650 obtains the adjusted pixel SP' equal to (r5',g5',b5') by subtracting the second threshold value TH2 from the pixel values of the sub-pixels r5, g5, and b5. As such, the value of the adjusted specific pixel SP' can be multiplied by the adjusting ratio AS, so as to output a pixel value P88' of the pixel P88 processed by the method for enhancing the contrast.

Figure 9:
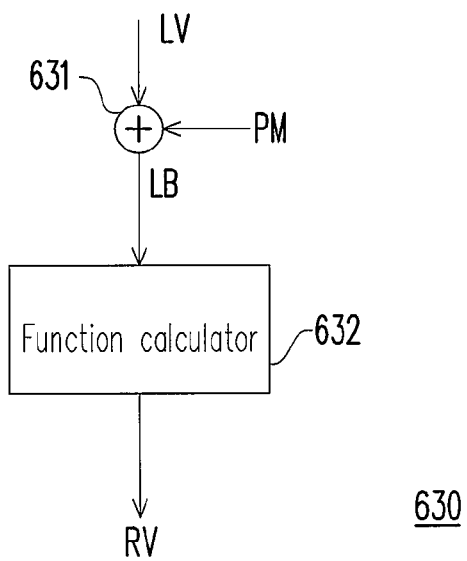
FIG. 9 is a block diagram illustrating functions of a brightness adjusting unit 630.
Figure 10:
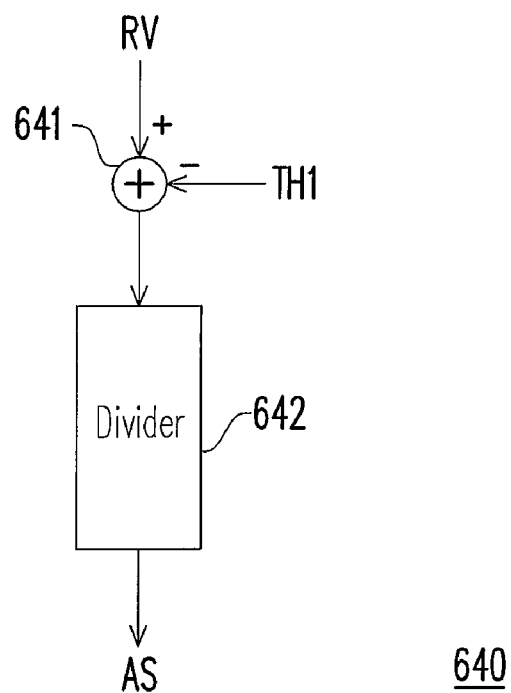
FIG. 10 is a block diagram illustrating functions of a ratio calculating unit 640.
Figure 11:
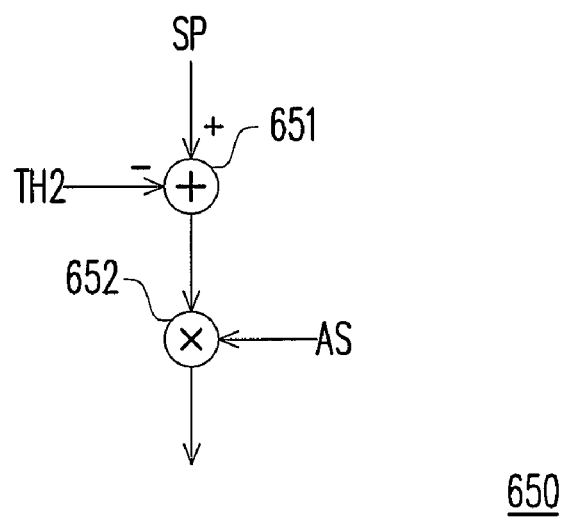
FIG. 11 is a block diagram illustrating functions of a contrast enhancing unit 650.

Next, the sub-blocks 630~650 in FIG. 5 will be further described hereinafter through functional block diagrams illustrated in FIGS. 9, 10, and 11. FIG. 9 is the block diagram illustrating functions of the brightness adjusting unit 630. FIG. 10 is the block diagram illustrating the functions of the ratio calculating unit 640. FIG. 11 is the block diagram illustrating the functions of the contrast enhancing unit 650.

Referring to FIG. 9, the brightness adjusting unit 630 includes an adder 631 and a function calculator 632. The algorithm processed by the adder 631 and the function calculator 632 can be referred in the equations (1)~(3). Here, the adder 631 adds the brightness base value LV to the constant PM and obtains the brightness enhancement value LB. Next, the function calculator 632 compares the brightness enhancement value LB with the maximum gray-scale value, so as to properly determine if the brightness enhancement value LB or the maximum gray-scale value is to be outputted.

The maximum gray-scale value represents an upper limit of the brightness of one image. Accordingly, as the brightness enhancement value LB exceeds the maximum gray-scale value, the function calculator 632 permits the output of the maximum gray-scale value instead of the output of the brightness enhancement value LB; otherwise, the output of the brightness enhancement value LB is determined.

Next, referring to FIG. 10, the ratio calculating unit 640 includes an adder 641 and a divider 642. The adder 641 subtracts the first threshold value TH1 from the value RV outputted by the brightness adjusting unit 630. Thereafter, the divider 642 performs a division operation on the maximum gray-scale value and the output of the adder 641, so as to further obtain the adjusting ratio AS.

Finally, referring to FIG. 11, the contrast enhancing unit 650 includes an adder 651 and a multiplier 652. The adder 651 is employed for performing the subtraction operation on the second threshold value TH2 and the pixel values of the sub-pixels in the specific pixel SP, while the multiplier 652 is used to perform a multiplication operation on the adjusting ratio AS and the output of the adder 651, so as to output the image having the contrast enhanced by the adjusting apparatus 600.

To verify the feasibility of the adjusting apparatus 600 taught by the embodiment of the present invention, a simulation of the original image depicted in FIGS. 12 through 16 is conducted, in which the adjusting apparatus 600 is assumed to have the constant PM equal to 80, the first threshold value TH1 equal to 12, and the second threshold value TH2 equal to 12.

Referring to FIGS. 12B~16B, the image depicted in FIG. 12B is the original image illustrated in FIG. 12A but processed by the adjusting apparatus 600. The image depicted in FIG. 13B is the original image illustrated in FIG. 13A but processed by the adjusting apparatus 600. The above principle is also applied to the relations between FIGS. 14B~16B and FIGS. 14A~16A.

Figure 17:
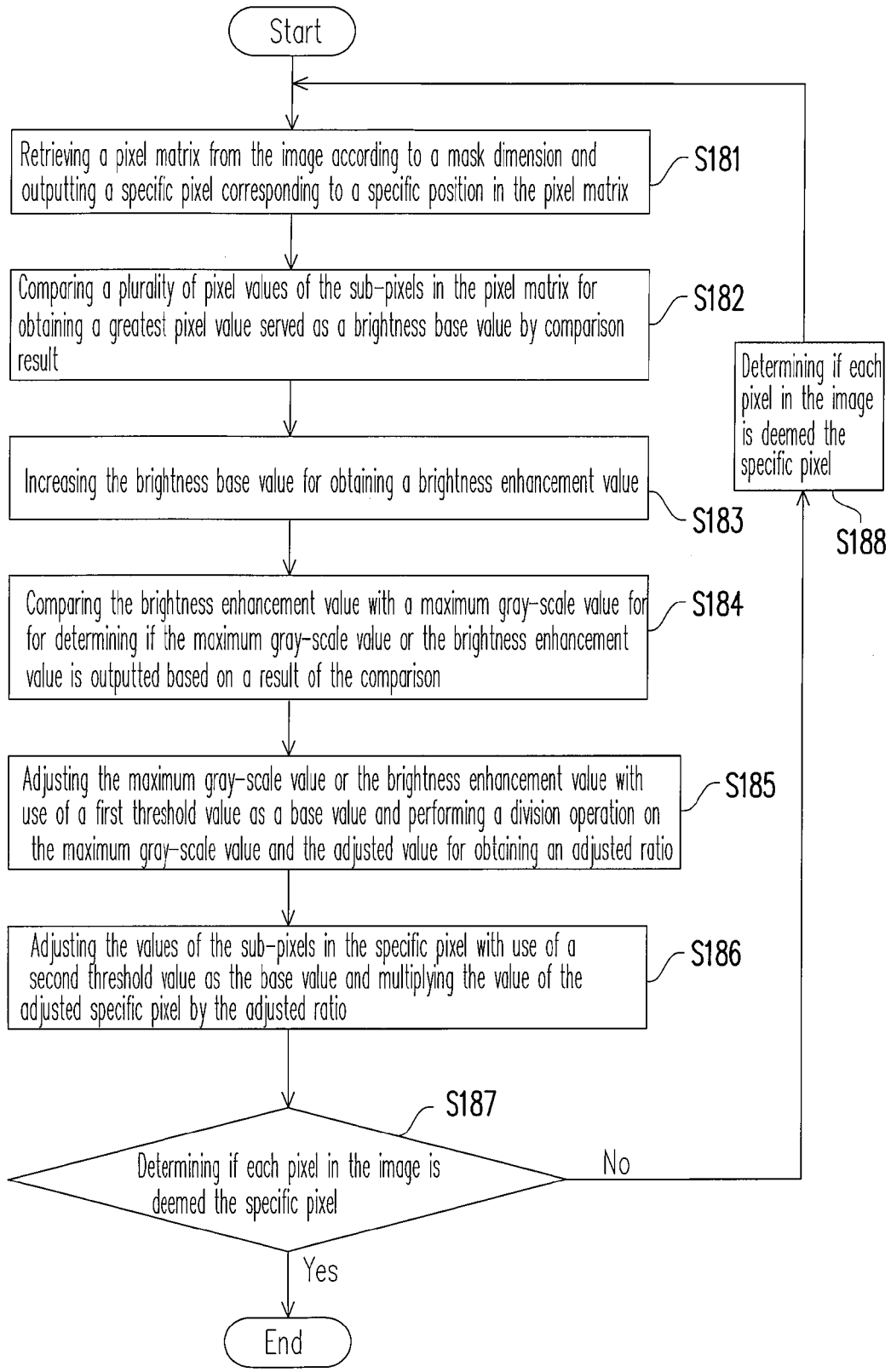
FIG. 17 is a flowchart illustrating an adjusting method for enhancing the contrast of an image according to an embodiment of the present invention.

Finally, please refer to FIG. 17 which is a flowchart illustrating an adjusting method for enhancing the contrast of an image according to the embodiment of the present invention. Referring to FIG. 17, during the process of enhancing the contrast of the image, a pixel matrix is firstly retrieved from the image according to a mask dimension in step S181, and a pixel corresponding to a specific position in the pixel matrix is outputted as a specific pixel. Since the adjusting method of the present embodiment merely aims at retrieving and processing the pixel matrix PTX constituted by several adjacent pixels at a time, it is not necessary to store the data of the entire image by using the massive memory spaces.

Next, in step S182, the pixel values of the sub-pixels in the pixel matrix are compared, so as to obtain the greatest pixel value served as a brightness base value by the comparison result. To determine the degree to which each of the pixels is required to be increased, the brightness base value is increased in step S183 according to the adjusting method, and a brightness enhancement value is accordingly acquired. Thereafter, in step S184, the brightness enhancement value is compared with a maximum gray-scale value, so as to output the maximum gray-scale value or the brightness enhancement value based on a result of the comparison.

Afterwards, in step S185, the maximum gray-scale value or the brightness enhancement value is adjusted with use of a first threshold value as a base value, and a division operation is performed on the maximum gray-scale value and the adjusted value, so as to obtain an adjusting ratio.

After obtaining the adjusting ratio, in step S186 of the adjusting method, the values of the sub-pixels in the specific pixel are adjusted with use of a second threshold value as the base value, and the value of the adjusted specific pixel is multiplied by the adjusting ratio, so as to output the specific pixel processed by the method of enhancing the contrast.

Next, in step S187, each of the pixels in the entire image is determined to ensure each of the pixels is already deemed the specific pixel in sequence. Suppose that one of the pixels in the image is not yet regarded as the specific pixel and thus not processed, the mask corresponding to the image is moved by one pixel in step S188 of the adjusting method. Thereby, the steps S181~S187 are repeated based on the moved mask. As such, each of the pixels of the image is sequentially processed as the specific pixel, so as to enhance the contrast of the entire image.

Note that the first and the second threshold values may be adjusted at will based on the actual demands of the adjusting apparatus. As regards other detailed steps of the adjusting method, no further description will be given hereinafter because the previous embodiments have clearly disclosed the same.

To sum up, a portion of the image is processed by the mask processor at a time according to the present invention, so as to reduce the memory space required by the adjusting apparatus. Further, in comparison with the related art, the adjusting apparatus of the present invention is adapted to the mobile devices requiring compactness and the low costs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An adjusting apparatus for enhancing the contrast of an original image comprising a plurality of pixels, each of the pixels comprising a plurality of sub-pixels, the adjusting apparatus comprising:
    a mask processor for retrieving a pixel matrix from the original image according to a mask dimension of the mask processor and outputting a specific pixel corresponding to a specific position in the pixel matrix;
    a brightness detecting unit for comparing a plurality of pixel values of the sub-pixels, so as to output a greatest pixel value served as a brightness base value by the comparison result;
    a brightness adjusting unit for generating a brightness enhancement value by increasing the brightness base value and comparing the brightness enhancement value with a maximum gray-scale value, so as to output the brightness enhancement value or the maximum gray-scale value based on a result of the comparison;
    a ratio calculating unit for adjusting the output of the brightness adjusting unit with use of a first threshold value as a base value and performing a division operation on the maximum gray-scale value and the adjusted value outputted by the brightness adjusting unit, so as to obtain an adjusting ratio; and
    a contrast enhancing unit for adjusting the values of the sub-pixels in the specific pixel with use of a second threshold value as the base value and multiplying the value of the adjusted specific pixel by the adjusting ratio, so as to output the value of the specific pixel processed by a method of enhancing the contrast.

2. The adjusting apparatus of claim 1, wherein the brightness adjusting unit obtains the brightness enhancement value through adding a constant to the brightness base value.

3. The adjusting apparatus of claim 2, wherein the constant is equal to 80.

4. The adjusting apparatus of claim 2, wherein the constant is presented as PM, the brightness base value is presented as LV, the sub-pixels have a k-bit gray-scale resolution, and the maximum gray-scale value is $(2^k-1)$, where k is an integer larger than 0, the brightness adjusting unit comprising:
    an adder for adding the brightness base value LV to the constant PM and producing the brightness enhancement value presented as LB; and
    a function calculator for comparing the brightness enhancement value LB with the maximum gray-scale value $(2^k-1)$, the function calculator outputting the brightness enhancement value LB when the brightness enhancement value LB is less than the maximum gray-scale value, the function calculator otherwise outputting the maximum gray-scale value when the brightness enhancement value LB is not less than the maximum gray-scale value, namely, the brightness adjusting unit outputting the brightness enhancement value LB or the maximum gray-scale value based on a first algorithm, wherein the value outputted by the brightness adjusting unit is presented as RV, and the first algorithm is:

$LB=LV+PM$ if $LB>(2^k-1), RV=(2^k-1)$ else RV=LB.

5. The adjusting apparatus of claim 4, wherein k is equal to 8.

6. The adjusting apparatus of claim 1, wherein the ratio calculating unit subtracts the first threshold value from the value outputted by the brightness adjusting unit, so as to generate the adjusted output of the brightness adjusting unit.

7. The adjusting apparatus of claim 1, wherein the first threshold value is equal to 12.

8. The adjusting apparatus of claim 1, wherein the first threshold value is presented as TH1, the value outputted by the brightness adjusting unit is presented as RV, the adjusting ratio is presented as AS, the sub-pixels have a k-bit gray-scale resolution, and the maximum gray-scale value is $(2^k-1)$, where k is an integer larger than 0, the ratio calculating unit comprising:

a first adder for performing a subtraction operation on the first threshold value TH1 and the value RV outputted by the brightness adjusting unit; and a divider for performing a division operation on the maximum gray-scale value and the value outputted by the first adder, namely, the ratio calculating unit obtaining the adjusting ratio AS according to a second algorithm which is $AS=(2^k-1)/(RV-TH1)$.

9. The adjusting apparatus of claim 1, wherein the contract enhancing unit subtracts the second threshold value from the values of the sub-pixels in the specific pixel, respectively, so as to obtain the adjusted specific pixel.

10. The adjusting apparatus of claim 1, wherein the second threshold value is equal to 12.

11. The adjusting apparatus of claim 1, wherein each of the pixels comprises three sub-pixels respectively presented as r, g and b, the second threshold value is presented as TH2, the adjusting ratio is presented as AS, and the specific pixel processed by the method for enhancing the contrast is presented as P', the contract enhancing unit comprising:

a second adder for performing a subtraction operation on the second threshold value TH2 and the sub-pixels r, g and b of the specific pixel, respectively; and a multiplier for performing a multiplication operation on the output of the second adder and the adjusting ratio AS, namely, the contract enhancing unit obtaining the specific pixel P' processed by the method for enhancing the contrast according to a third algorithm which is:

$P'=((r-TH2),(g-TH2),(b-TH2))*AS$.

12. The adjusting apparatus of claim 1, wherein the sub-pixels have a k-bit gray-scale resolution, and the maximum gray-scale value is $(2^k-1)$ where k is an integer larger than 0.

13. The adjusting apparatus of claim 1, wherein the specific position is corresponding to a center pixel of the pixel matrix.

14. An adjusting method for enhancing the contrast of an original image comprising a plurality of pixels, each of the pixels comprising a plurality of sub-pixels, the adjusting method comprising:

retrieving a pixel matrix from the original image according to a mask dimension and outputting a specific pixel corresponding to a specific position in the pixel matrix;

comparing a plurality of pixel values of the sub-pixels in the pixel matrix, so as to obtain a greatest pixel value served as a brightness base value by the comparison result;

increasing the brightness base value to obtain a brightness enhancement value;

comparing the brightness enhancement value with a maximum gray-scale value, so as to output the maximum gray-scale value or the brightness enhancement value based on a result of the comparison;

adjusting the maximum gray-scale value or the brightness enhancement value with use of a first threshold value as a base value and performing a division operation on the maximum gray-scale value and the adjusted value, so as to obtain an adjusting ratio;

adjusting each of the sub-pixels in the specific pixel with use of a second threshold value as the base value and multiplying the value of the adjusted specific pixel by the adjusting ratio; and moving the mask by one pixel and repeating the above steps until each of the pixels in the original image is sequentially deemed the specific pixel.

15. The adjusting method of claim 14, wherein the step of increasing the brightness base value presented as LV comprises:

adding the brightness base value LV to a constant PM and producing the brightness enhancement value referred to as LB (LB=LV+PM), wherein the constant is presented as PM, while the brightness enhancement value presented as LB.

16. The adjusting method of claim 15, wherein the constant PM is equal to 80.

17. The adjusting method of claim 15, wherein the result of comparing the brightness enhancement value with the maximum gray-scale value is presented as LV, the sub-pixels have a k-bit gray-scale resolution, and the maximum gray-scale value is $(2^k-1)$, where k is an integer larger than 0, the step of outputting the maximum gray-scale value or the brightness enhancement value based on the result of the comparison comprising:

outputting the brightness enhancement value LB when the brightness enhancement value LB is less than the maximum gray-scale value; or outputting the maximum gray-scale value when the brightness enhancement value LB is greater than the maximum gray-scale value, which is represented as the following:

if $LB>(2^k-1), RV=(2^k-1)$ else RV=LB.

18. The adjusting method of claim 17, wherein k is equal to 8.

19. The adjusting method of claim 14, wherein the step of adjusting the brightness enhancement value or the maximum gray-scale value with use of the first threshold value as the base value comprises:

performing a subtraction operation on the first threshold value and the maximum gray-scale value or on the first threshold value and the brightness enhancement value.

20. The adjusting method of claim 14, wherein the step of adjusting each of the sub-pixels in the specific pixel with use of the second threshold value as the base value comprises:
   performing a subtraction operation on the second threshold value and the values of the sub-pixels in the specific pixel.

21. The adjusting method of claim 14, wherein the sub-pixels have a k-bit gray-scale resolution, and the maximum gray-scale value is $(2^k-1)$ where k is an integer larger than 0.

22. The adjusting method of claim 14, wherein the specific position is corresponding to a center pixel of the pixel matrix.

23. The adjusting method of claim 14, wherein the first threshold value is equal to 12.

24. The adjusting method of claim 14, wherein the second threshold value is equal to 12.

* * * * *